United States Patent [19]

Pray

[11] 4,111,080
[45] Sep. 5, 1978

[54] STAPLE FASTENING TOOL
[75] Inventor: Winston C. Pray, Lombard, Ill.
[73] Assignee: Flexible Steel Lacing Company, Downers Grove, Ill.
[21] Appl. No.: 765,788
[22] Filed: Feb. 4, 1977
[51] Int. Cl.$^2$ ............................................. B23P 11/00
[52] U.S. Cl. ................................................. 29/243.51
[58] Field of Search ............. 29/243.5, 243.51, 243.56; 227/30, 124; 269/236, 254 CS

[56] References Cited
U.S. PATENT DOCUMENTS

| | | | |
|---|---|---|---|
| 637,902 | 11/1899 | Spery | 29/243.51 |
| 2,926,387 | 3/1960 | Lombardo et al. | 269/254 CS |
| 3,261,085 | 7/1966 | Hobson | 29/243.51 |
| 3,424,450 | 1/1969 | Atkins | 269/236 X |
| 3,581,350 | 6/1971 | McComb | 29/243.51 |

*Primary Examiner*—James L. Jones, Jr.
*Attorney, Agent, or Firm*—Fitch, Even, Tabin & Luedeka

[57] ABSTRACT

An applicator apparatus for securing belt fasteners to belt ends by staples comprises a staple guide block means having resiliently biased pin means for exerting a clamping force to hold the belt end against shifting during the driving of the staples through the belt and the clinching of the ends of the staples against the belt fasteners. The preferred applicator is formed to accommodate various widths of belts by releasably securing a series of separate applicator units each having a staple guide block and secured to a base plate in predetermined and aligned portions thereon. An adjustable cam lever allows shifting of the staple guide block means to accommodate different thicknesses of belts. A gauge pin is eliminated by having shoulder surfaces on the staple guide block means hold the belt fasteners with their hinge pin receiving ends in alignment with one another.

12 Claims, 7 Drawing Figures

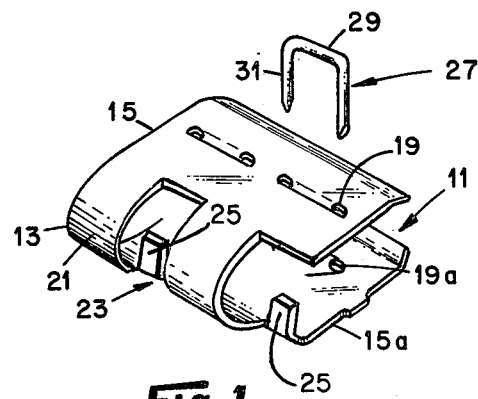
Fig. 1
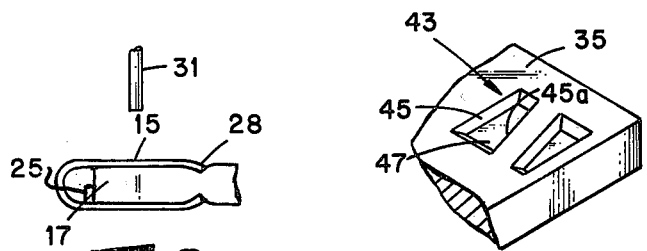
Fig. 2
Fig. 4
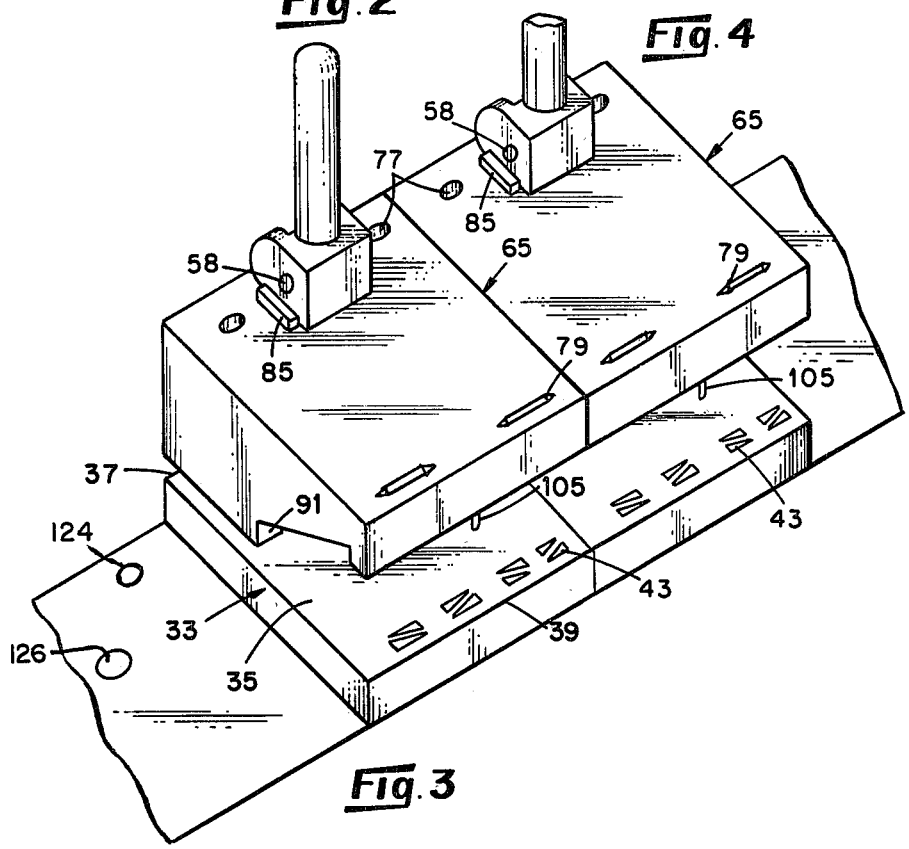
Fig. 3

STAPLE FASTENING TOOL

This invention relates to a device useful as an aid in inserting staples, more particularly where the staples are inserted through holes in a rigid fastener and a second article to which the fastener is being attached. The device has particular utility for the attachment of U-shaped hinge fastener members to the ends of flexible belts being transformed into "endless" conveyor belts, or loops.

The fastening means commonly used for attaching belt ends to form a loop comprise a pair of generally elongated U-shaped fasteners of a rigid material such as steel. Matching holes are provided in the opposing legs of the "U". After a belt end is inserted between the walls of the "U", generally U-shaped staples are inserted through the holes provided in one wall of the fastener, through the thickness of the belt, then through the matching holes in the opposing wall of the fastener. The exiting staple leg ends are then clinched or otherwise misshapen to prevent withdrawal of the staple.

Mating slots are provided in the curved bases of each pair of fasteners. After a fastener is attached to each end of the belt, the fasteners are matingly joined so that the curved base portions cooperatively form a generally circular shaft into which a generally cylindrical hinge pin is inserted to maintain the fasteners in their mated position.

When fasteners are stapled to other articles, such as flexible belts, the motion of at least four separate objects must be controlled: the fastener, the end of the belt, the staple, and the force applicator (such as a hammer). In addition, a fifth object, a driver, is frequently used between the hammer and the staple to insure proper application of force to the staple. Misapplied force can cause the staple to change direction or buckle, thus weakening the attachment.

In order to reduce the number of operators' hands necessary for a stapling operation, to reduce the possibility of accidental injuries and to improve the reliability of the attachments, various devices have been proposed for aiding in the insertion of staples.

An example of such a device is disclosed in U.S. Pat. No. 3,581,350. In this and most such devices, there is generally provided a staple guide member and an anvil member. The fastener and inserted belt end are placed between the guide member and the anvil, which are then fixed in positions immediately adjacent the opposing walls of the fastener in a clamp-like fashion. Then a staple is driven through the guide member and through the fastener and belt and the staple legs are clinched by striking the anvil member. While such devices have been useful in certain applications, they have suffered from several deficiencies.

It is desirable that a stapling device be adjustable to compensate for different sized belts and fasteners. Such adjustability has been provided heretofore in one instance by a vertical post which is attached to the anvil and provided with external threads. The post is slidably received through a bore provided in the guide member. The post is capped with a threaded adjusting nut. Rotation of the nut controls the distance allowed between the anvil member and the guide member. Such an adjustment system may be acceptable for systems in which adjustment of the distances between the anvil member and the guide member is required only relatively infrequently as when the fastener size is changed. However, when more frequent adjustments are necessary, adjustment by threading a nut is too time-consuming.

As noted above, during the joining operation the fastener and belt must be held in fixed relation to one another and the stapling device. After placement of the fastener between the anvil member and the guide member, motion of the fastener is sometimes prohibited by guide member slots which matingly engage the slots in the curved base portion of the fastener. Withdrawal of the fastener is sometimes prohibited by a separate key passed through the curved base of the fastener after passing between such mating slots. It has been suggested also that such withdrawal be prevented by a lip or teeth provided along the outer edge of the anvil member and/or guide member. However, if such means are provided for preventing inadvertent withdrawal of the fastener, the spacing between the guide member and anvil member must be adjustable to an open position, when a fastener is inserted or withdrawn, and to a closed position for stapling. If a threaded nut is used, it must be threaded down and up for every stapling operation. In addition to the time consumed by such, the precision of the positioning is less than desirable in that an operator may adjust the distance less than the amount necessary to insure complete stability of the fastener and the belt.

As staples are positioned farther from the edge of the belt, the strength of the attachment is increased, e.g. because unraveling and/or pull-out problems are diminished. However, the lengths of the fastener walls are generally minimized for reasons of economy in materials and to maximize the flexibility of the finished belt. As a result of these competing concerns for maximum belt insertion and minimal fastener wall length, it is important that the belt end is retained in a position in which a maximum distance is maintained between the belt end and staples.

The belts employed are frequently quite long and heavy and thus easily shift during stapling. In efforts to control belt movement prior devices have employed "teeth" or other projections fixed to the guide member to grip the belt during stapling. However, the fixed "teeth" employed up to this time have not proved adequate: the belt ends have continued to shift. If fixed teeth are dull, the belt can slide from between the anvil member and guide member. If the teeth are made long enough to insure adequate pressure to inhibit sliding, there is a risk of damage to the belt or that the fastener is not adequately supported. Sharpening the teeth to provide a better grip damages the belt, which is particularly troublesome because the stresses are significant in the region around the fastener. In addition, exposed, sharp objects frequently can cause injuries to operators.

Further, because belts vary both in material and thickness, different types of fixed "teeth" are required to accommodate such variations. Changing the type of teeth generally entails changing the guide member. Consequently, even if a guide member is otherwise adequate, there is a tendency for an operator to save time by not changing the quide means and instead relying upon an inadequate grip.

A secondary means for improving the attachment of the fastener to the belt end comprises bending the outboard ends of the U-shaped fastener slightly inwardly, i.e. toward one another, to form an inwardly projecting lip or lips on the extremeties of the legs of the U-shaped cross-sectional fastener in order to "grip" the belt when the legs of the "U" are closed against the belt therebetween. However, in order to allow placement of the belt end within such a fastener, it is necessary to spread the "legs" of the "U" sufficiently to compensate for the bent gripping portion. The fastener legs then generally form an acute angle rather than being parallel. Placement of such an angular fastener between an anvil member and a guide member which are generally parallel creates problems: the fastener can rock, shifting the opposing holes out of alignment and reducing the amount of belt within the fastener.

Due to their complexities, and for other reasons, prior devices have required considerable construction time because many individual pieces are required, such construction significantly increasing the expense of the devices.

Accordingly, it is an object of the present invention to provide a stapling device which will maintain a fastener, belt end, and staples in fixed relation to one another for insertion of the staples.

It is also an object of the present invention to provide means for adjusting the distance between the guide member and the anvil member which is fast and reliable.

It is a further object to provide such a stapling device and which is quickly and easily constructed. Other objects and advantages of the invention will be apparent from the following description, including the drawings in which:

FIG. 1 is a perspective view of a fastener and staple suitable for use in accordance with the invention;

FIG. 2 is a side elevational view of a fastener, belt end and staple suitable for use in accordance with the invention;

FIG. 3 is a perspective view of a device embodying various of the features of the invention;

FIG. 4 is a fragmentary perspective view of anvil means shown in FIG. 3;

Figure 5:
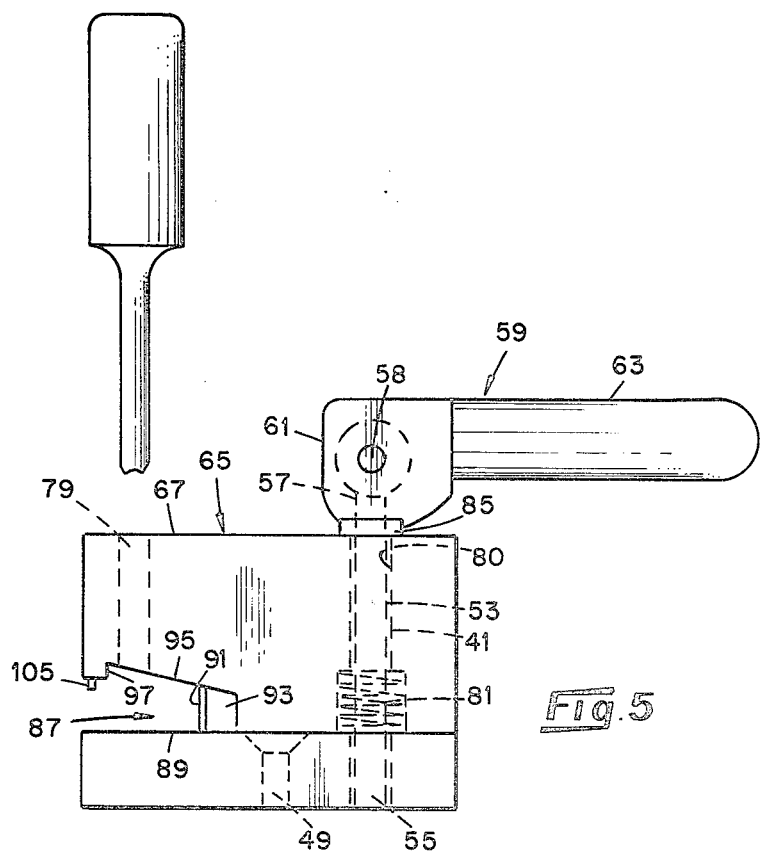
FIG. 5 is a plan view of a device embodying various of the features of the invention.
Figure 6:
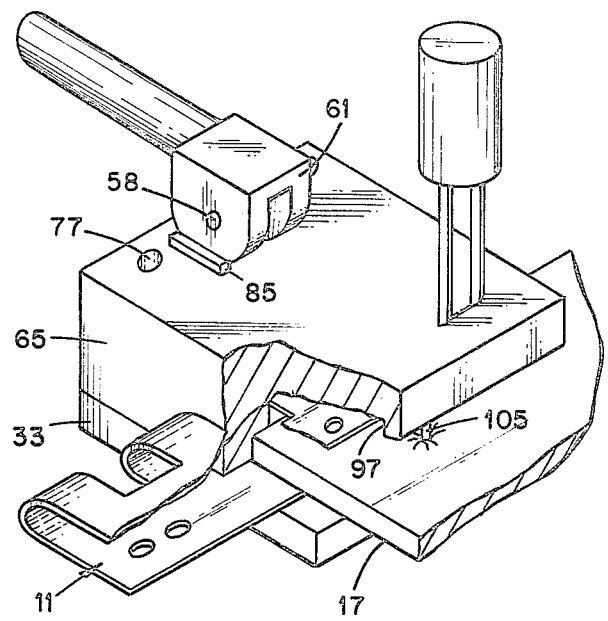
FIG. 6 is a fragmentary perspective view, partly in section, of a belt end, a fastener and a device embodying various of the features of the invention.

Generally, the disclosed invention comprises an anvil member, a guide member attached to the anvil member by adjustable means and including means for gripping a fastener and belt in preselected relative positions during insertion of staples by force applied by a driver slidably received in shafts provided in the guide block.

In use, the anvil member and guide member are adjustable to an open position. A fastener, with a belt end positioned therein, is placed between the anvil and guide member in a position insuring alignment of holes provided in the fastener with staple shafts provided in the guide member (adapted to slidably receive staples) and with bending cavities provided in the anvil member. The anvil member and guide member are then adjusted to a closed position in which the fastener and belt are firmly gripped. A staple is then driven through a staple channel, the legs leading the base, through the fastener holes and the depth of the interposed belt. The staple is driven until the base rests upon the fastener wall adjacent the guide member. Continued force by the driver bends the fastener until the fastener legs are parallel to one another and the staple legs are meanwhile bent upon the anvil member surface as they protrude from the fastener holes adjacent the anvil member. The anvil member and guide member are then adjusted to an open position and the attached fastener and belt are removed.

Referring to the drawings, the primary goal sought is the attachment of an elongated fastener 11, having a generally curved base 13, a first wall 15 and a second wall 15a, to a second article such as a flexible belt end portion 17. The belt end 17 commonly is of a flexible and slightly yieldable woven or nonwoven material, including cotton and rubber. Holes 19 and 19a are provided in the fastener walls 15 and 15a, respectively. The fastener 11 is frequently a rigid material, such as steel, so that piercing by staples is unreasonable and holes are therefore provided.

The base 13 comprises a plurality of ribs 21 defining slots 23 to provide a shape suitable for a mating junction with a similar fastener. Depending from the fastener wall 15 is a lug 25 which serves to prevent the belt end 17 from being inserted into the slots 23, where it would interfere with mating fasteners. The outboard ends 28 of the fastener walls 15 and 15a are each bent toward one another out of the planes of the walls 15 and 15a.

Attachment of the fastener 11 to the belt end 17 is accomplished by means of generally U-shaped staples 27, each comprising an elongated base (or driving surface) 29 and two spaced apart legs 31 attached thereto. The distance between the staple legs 31 is substantially the same as the distance between each pair of holes 19 provided in each fastener wall 15 and 15a so that the staples 27 can penetrate the fastener walls without significant resistance. The length of the staple legs 31 is sufficiently greater than the thickness of the belt 17 to provide a sufficient length, at least about one-eighth inch, of staple leg to protrude from the fastener for clinching.

In the disclosed stapling device there is provided an anvil means 33, including an impact surface 35 having an orienting portion 37 and an opposite impact portion 39. Attached to the anvil surface 35, and extending generally perpendicularly therefrom within the orienting portion 37, are a pair of spaced apart orienting posts 41.

Also, included in the impact surface 35 within the impact portion 39 are bending cavities 43. It is preferred that one cavity 43 is provided for each staple leg 31, so that a pair of cavities 43 is provided for each staple 27.

Each bending cavity 43 preferably comprises two oppositely disposed side walls 45 and 45a, essentially perpendicular to the impact surface 35 and a bending wall 47 adjoining both side walls 45 and 45a and which slopes at about 30° from the striking surface 35, runs essentially parallel to the striking surface for about ⅓ of the length of the bending cavity 43, and then slopes at about 30° to again meet the striking surface 35.

The bending cavity side walls 45 and 45a are desirably close to parallel to the belt end when a staple is inserted. In this manner, the legs 31 of the staples are bent in directions generally parallel to the belt end 17. This is the desired position because it is the position from which the staples are least likely to be extracted by stresses applied to the belt.

A threaded bore 49 is defined through anvil means and adapted to receive a threaded bolt for stable attachment of the anvil to a table (not shown), etc. In addition, a threaded bore 51 is defined in the anvil means 33, and adapted to receive a threaded elongated lock pin 53 having one of its ends 55 threadably received in threaded bore 51 and extending from the impact surface of the anvil essentially parallel with the orienting posts 41. The outboard end of the lock pin terminates at a height above the anvil surface 35 greater than the thickness dimension of the guide block 65.

Pivotally attached to the outboard end 57 of the lock pin 53 by means of a pivot pin 58 is a cam lever 59, comprising a generally oval cam 61 and an integrally attached lever 63 which, through rotation, controls the effective distance between the anvil surface 35 and the cam 61.

A guide block 65 is slidably mounted upon the orienting pins 41 and the lock pin 53 and includes an exposed surface 67, an oppositely disposed inner surface 69, and a positioning portion 71. Sliding motion, without wobbling, is accomplished by the provision of generally cylindrical orienting bores 75 and 77 passing through the depth of the guide block 65 from the exposed surface 67 to the inner surface 69. A lock pin bore 78 similarly is provided through the depth dimension of the guide block. The diameter of the lock pin bore 78 and the orienting bores 75 and 77, respectively, are sized slightly larger than the diameters of the respective lock pin 53 and orienting pins 41 to allow sliding motion therebetween without wobbling of the guide block 65 relative to the anvil 33. When the guide block 65 is mounted upon the orienting pins 41 and lock pin 53, the inner surface 69 of the guide block faces the impact surface 35 of the anvil 33.

Also passing through the depth of the guide block from the exposed surface 67 to the inner surface 69 are a plurality of staple shafts 79. The staple shafts 79 are preferably generally perpendicular to the impact surface 35 of the anvil 33 and positioned in register with the bending cavities 43 in the impact surface 35 when the guide block 65 is in the closed position. The cross-sectional shape of the staple shafts is generally diamond-shaped, one axial dimension of the diamond being parallel to an inserted belt end and slightly larger than the length of the staple base 29 to allow sliding motion of the staple 27 through the shaft 79 yet maintain the legs 31 of the staple essentially parallel to the shaft axis. As will be described more fully hereinafter, a diamond-shaped shaft allows structural strength for a driving element shaped to pass slidably therethrough.

As noted previously, attached to the lock pin 53 adjacent the exposed surface 67 of the guide block 65 is the cam 61. Contact between the cam 61 and the exposed surface 67 is preferably maintained through biasing action of a coil spring 81 which is disposed around the lock pin 53 between the anvil impact surface 35 and guide block inner surface 69. This same spring further biases the guide block out of contact with the anvil. A cavity 83 is provided in the guide block inner surface 69 to receive therein the compressed height of the coil spring 81 and allow contact between the anvil impact surface 35 and guide block inner surface 69.

Elongated stabilizing lugs 85 extend generally perpendicularly from the guide block exposed surface 67 adjacent to the cam 61. The lugs 85 are spaced apart to receive the cam lever 59 therebetween to prevent inadvertent rotation of the cam lever 59 and attached lock pin 53. As noted above, such rotation adjusts the distance between the anvil impact surface 35 and the guide block inner surface 69 by reason of the threaded attachment of the lock pin 53 to the anvil 33. Accordingly, once the lock pin has been rotated to the desired height above the anvil surface and the cam rotated to move the guide block to its closed position, the cam lever is received between the lugs 85 and locked against further rotation of the lock pin. The rotational position of the lock pin is maintained by the lugs even when the guide block is in its open position.

In order to grip a fastener 11 during insertion of the staples 27, a channel 87 of generally U-shaped cross-section is cooperatively defined by the anvil impact surface 35 and the guide block inner surface 69. While nonplanar surfaces may be provided in both the anvil 33 and the guide block 65, it is preferred that the anvil impact surface 35 be substantially planar to provide a first channel wall 89 that defines one leg of the generally U-shaped cross-section and which receives one wall 15a of fastener 11 in engagement therewith.

The base of the U-shaped cross-sectional channel 87 is defined by a second wall 91, provided on the guide block and orienting generally perpendicular to the anvil impact surface and essentially parallel to a plane generally formed by the staple shafts 79. A plurality of alternating slots 93 are provided in the second channel wall 91 to matingly receive the alternating ribs 21 in the fastener base 13 and prohibit lateral motion of the fastener 11 within the channel 87.

Adjoining the second channel wall 91 is a third channel wall 95 that defines the second leg of the generally U-shaped cross-sectional channel. This third wall 95 is inclined upwardly from its junction with the second channel wall 91 and which defines a retainer lip 97. That is to say, the plane of the third channel wall 95 is inclined with respect to the plane of the first channel wall 89 so that the legs of the U-shaped cross-sectional channel 87 diverge in a direction outwardly from the second channel wall 91.

The height of the second channel wall 91 is essentially the same as the height of the fastener base 13 and the length of the third channel wall 95 is essentially the same as the length of the fastener wall 15. The depth of the retainer lip 97 is preferably about (¼) inch, which compensates for a small amount of variance in the shape of the fastener 11 as the fastener walls 15 and 15a are pushed from an angular position relative to one another to a generally parallel position.

In the present tool, there is provided a spring plunger pin 99, such as manufactured VLIER Engineering Corporation of Burbank, mounted in the guide block inner surface and outboard of the retainer lip 97. This plunger pin 99 extends toward the anvil striking surface 35 and when the tool is in a closed position, the distance from the anvil striking surface 35 to the Vlier plunger pin 99 is such that the pin 105 contacts a belt 17 disposed in the channel 87.

The spring plunger pin 99 comprises a generally cylindrical sleeve 101 having an outboard end 102 and an annular shoulder 103 on the interior surface of the outboard end of the sleeve 101. A pin 105 having a point 107 and a head 109 is slidably mounted through the annular shoulder 103, the pin head 109 being retained within the sleeve 101 by the annular shoulder 103 and the point 107 extending through the outboard end 102 of the sleeve. Disposed within the sleeve 101 is a coil spring 111 having a first end 113 in contact with the pin head 109 and a second end 115 in contact with a set screw plug 116 which threads into the upper end of the sleeve 101 and abuts the upper end of the coil spring. The latter biases the pin 105 to a position in which the pin head 109 rests against the annular shoulder 103 with the pin 105 in its most extended position.

Preferably, the Vlier pin sleeve 101 is forced into a generally cylindrical cavity 117 in the guide block second surface 69 having a diameter the same as, for slightly smaller than, the outer diameter of the sleeve 101, thus assuring a friction-tight fit of the sleeve 101 with the cavity 117.

For driving the staples, there is provided a driver 119 which includes a generally cylindrical main column 121 including a receiving end 123 and a split end 125. Parallel and integrally attached to the main shaft column at the split end 125 are a pair of driving columns 127, each of which is generally diamond-shaped in cross section. These driving columns are spaced-apart to be received in the staple shafts 79. The outboard driving end 131 of each driving column includes an elongated groove 133, aligned with the major axis of the diamond-shaped cross section of its respective staple shaft, to receive the staple base 29. Thus, the diamond shape allows distribution of a staple-driving force along the entire base 29 of the staple 27 and also provides structural reinforcement to prevent deformation of the driving columns 127 when extraordinary forces are applied to the driver 119. On the same hand, this geometrical configuration minimizes the amount of material required in construction of the driver. Also, the diamond-shaped staple shaft maintains a proper orientation of the staple 27 with respect to the holes 19 in the fastener walls 15 and 15a and the bending cavities 43.

In operation, the cam lever 63 is raised to cause the guide block to move to its open position. A fastener 11 is inserted into the channel 87 to a position in which the alternating slots 93 in the second channel wall 91 matingly engage the alternating ribs 21 in the fastener base 13 and one fastener wall 15a rests upon the anvil striking surface 35. A belt end 17 is then inserted between the fastener walls 15 and 15a until the belt end 17 contacts the lugs 25. The guide block is then moved to a closed position by pivoting the cam lever 59 about 90°, the increasing radius of the cam 61 urging the guide block 65 against the bias of the coil spring 81 to a position in which a portion of the anvil striking surface 35 contacts the guide block second surface 69 as shown in FIG. 5. As the guide block 65 approaches the closed position, the pin 105 contacts the belt 17, partially penetrating the belt and receding into the sleeve 101, against the bias of the coil spring 111. The amounts of penetration and recession depend upon the material of the belt 17, the strength of the biasing spring 111 and the sharpness of the point 107. It is desirable for the pin 105 to penetrate the belt as far as is possible without damage to the belt. Such a goal is best accomplished by using a dull pin point 107 and a relatively stiff coil spring 111. Such a combination allows use with a wide variety of belts, without consequential damage to lightweight belts nor shifting of heavier belts.

At this point, the fastener 11 is firmly engaged between the second wall 91 and the retainer lip 97. The fastener 11 rests upon the anvil striking surface 35 and is prevented from being lifted therefrom by the third channel wall 95. Sliding motion within the channel 87 is prevented by the mating engagement of the slots 93 and ribs 21.

The belt 17 is prevented from moving by its engagement with the pin 105. The strength of the spring 111 is sufficient to overcome normal shifting forces applied to a belt during an assembly operation. The belt is prevented from pivoting about pin 105 by a plurality of spaced points of contact between the belt end 17 and the lugs 25.

A staple 27 is then inserted, legs first, into each staple shaft, through which it slides until the legs 31 pass through the holes 19 provided in the fastener wall 15 in contact with the third channel wall 95 and contact the belt 17. The driver driving columns 127 are inserted into a pair of adjacent shafts 79 and slide freely therethrough until the driving end groove 133 of each engages a staple base 29.

A force, such as a hammer blow, is then applied to the receiving end 123 of the main driver column 121, driving the staple leg 31 through the belt thickness and the holes 19a in the fastener wall 15a resting upon the anvil striking surface 35 until the staple base 29 contacts the fastener wall 15 contacting the guide block second surface 69. Further driving of the staple 27 forces the fastener wall 15 to a position parallel to the other fastener wall 15a, thus causing the outboard ends 28 of the fastener walls 15 and 15a to "bite" into the belt 17.

Figure 7:
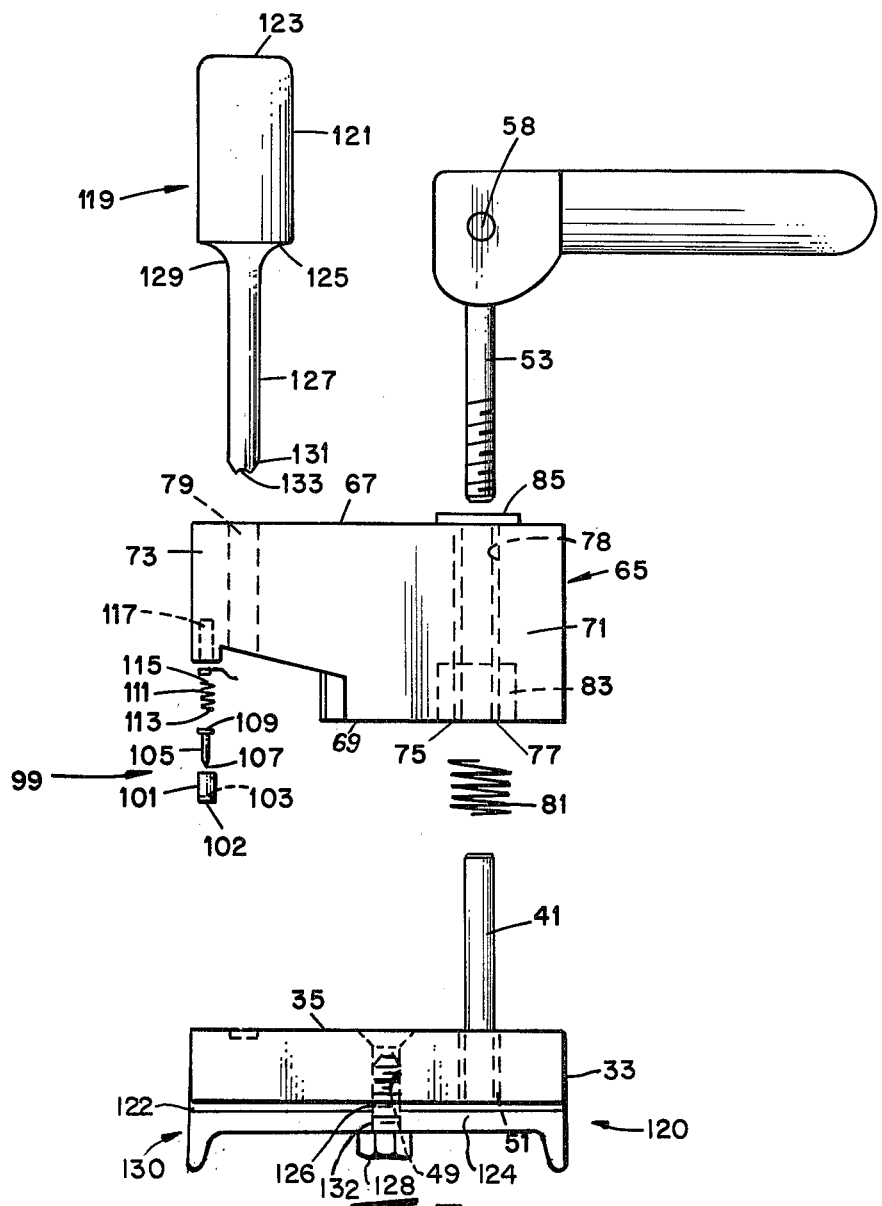
FIG. 7 is an exploded plan view of a device embodying various of the features of the invention.

Meanwhile the staple legs 31 strike the anvil impact surface 35 at the bending cavities 43. The angled formation of the bending cavities 43 cause each staple leg 31 to be bent to a position generally parallel with the belt 17 and fastener walls 15 and 15a. As shown in FIG. 4, several staple shafts 79 are provided in the guide block 65 to allow several staples to be inserted each time the device is closed. In this illustrated embodiment of the invention, each staple applicator unit is a modular unit which is adapted to be mounted side-by-side with other units until a desired width, e.g., the entire width of the belt, is achieved. Herein, each applicator unit is mounted on a common base means 120 (FIG. 7) which comprises a flat planar template plate 122 having a pair of holes 124 therein precisely located therein on the template for each unit. These holes 124 are sized for a snug, wedge fit with the lower ends of the dowel pins 41 of each applicator unit. The templates likewise have a third hole 126 which receives a shaft of a bolt 128 which threads into each anvil means 33. The bolts 128 and dowel pins 124 locate each anvil means 33 in side-by-side abutted relationship so that the belt fasteners will be aligned to receive the hinge pin through their looped ends. Herein, the base plate means 120 preferably includes a lower supporting channel 130 (FIG. 7) having a top planar web within openings 132 therein through which extend the bolts with their heads tightened against the underside of the channel web to secure fixedly each anvil means 33 onto the template and to the underlying channel 130. In this manner, dislodgement or shifting problems attendant to moving a belt and fastener joined by only a few staples are minimized. This type of arrangement is particularly desirable with belts as wide as four feet.

In the event that a different sized fastener or staple is desired, either for added strength or a belt having a different thickness, a different guide block 65 may be used with the same anvil, lock pin and cam lever combination. Such a substitution is accomplished by manually urging the guide block 65 toward its closed position sufficiently to allow the cam 61 to clear the lugs 85 and then unthreading the lock pin 53 while the cam lever 59 is in the open position.

The preferred material for the guide block 65 and cam lever 59 is a fiberglass filled Lexan, a commercially available product. This material is strong, yet lightweight, and moldable to provide all of the lugs, bores, shafts, etc., included in the guide block 65 in a single step.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. An applicator apparatus for securing hinge fasteners having alternating ribs to the end of a belt by staples, said applicator apparatus comprising an anvil means having an anvil surface for deflecting lower free ends of the staples to clinch the staples to the underside of the belt fasteners, a staple guide block means mounted over said anvil means with a portion thereof spaced from said anvil surface to admit a belt end therebetween, means mounting said staple guide block means for relative movement with respect to said anvil means between an open position admitting the belt end and a closed position for holding the belt for staple application, means for shifting said staple guide block means, means in said guide block defining vertically extending open shafts for receiving staples to be driven through said belt fasteners and the belt end, means for aligning the belt fasteners relative to said staple guide block means and to said anvil surfaces and including alternating slots to matingly receive alternating ribs in the hinge fastener, depending means on the outer edge of said guide block means for abutting the free ends of said belt fastener legs to hold said ribs of said fasteners in said slots during a stapling operation, and a resilient clamping means associated with said staple guide block means and said anvil means and engaging the belt end and applying a holding force thereto to resist shifting of the belt end during driving of the staples through the belt and the clinching of the staple ends.

2. An applicator apparatus in accordance with claim 1 in which said resilient clamping means comprises at least one resiliently biased pin located on an outer lip portion of said guide block and carried downwardly thereby against the belt end.

3. An applicator apparatus in accordance with claim 1 in which said depending means includes an outer depending lip for abutting the free ends of the belt fastener legs and in which an inclined surface on said guide block means abuts the inclined upper legs of the belt fasteners.

4. An applicator apparatus in accordance with claim 1 in which said means for shifting said staple guide means relative to said anvil means comprises a lock pin having a lower end threaded into said anvil means to allow turning adjustment of the lock pin, a cam lever pivotally attached to the upper end of the lock pin, and shoulder means on said guide block for abutting said cam lever and preventing inadvertent rotation thereof and the attached locking pin to adjust the same.

5. An apparatus in accordance with claim 1 in which said staple guide block means comprises a molded plastic body and in which said anvil means comprises a metal plate.

6. An apparatus for the attachment of hinge fasteners to the ends of flexible belts by the insertion of staples through holes provided in said fasteners and through the belt thickness, comprising an anvil means having an impact surface including an impact portion and an orienting portion, an elongated lock pin having an attached end and an extended end, said attached end being attached to and projecting upwardly from said orienting portion of said anvil surface, a cam lever pivotally attached to said extended end of said lock pin, guide block means slidably mounted upon said lock pin between said anvil means and said cam lever whereby said guide means is movable between open and closed positions relative to said anvil means, said cam lever being positioned and shaped to selectively urge said guide block toward said anvil surface, said guide block means including a positioning portion having an exposed surface and an oppositely disposed inner surface and defining a plurality of receiving shafts therethrough between said exposed and inner surfaces, means orienting said guide block with respect to said anvil means with said inner surface of said guide block facing said impact portion of said anvil surface to co-operatively define a channel therebetween that is adapted to withdrawably receive a fastener and belt therein when said guide block is in an open position and means aligning said fasteners and holding the same against rearward movement and for retaining said fastener and belt in an aligned position with respect to said staple shafts when said guide block is in a closed position, driver means slidably and withdrawably received within said staple shafts, a retainer lip depending from said positioning portion of said guide block into said channel and toward said anvil surface to engage and hold the belt fastener against forward movement, pin means mounted in said retainer lip and depending beyond said retainer lip into said channel, and means resiliently biasing said pin toward a belt disposed in said channel to engage said belt and restrain the same against movement out of said channel when said guide block is in its closed position.

7. The device described in claim 6 wherein said inner surface of said guide block means is oriented in a plane that is inclined with respect to the plane of said anvil surface, said co-operatively defined channel therebetween having a generally U-shaped crosssection in which the legs of the U-shape diverge in the direction of the open end of the U-shape.

8. The device described in claim 6 wherein said attached end of said lock pin is threadably received in said anvil to allow adjustment of the length of that portion of said pin that extends from said anvil.

9. The device described in claim 8 and including lug means provided integral with said first surface of said guide block adjacent said cam lever to inhibit rotation of said lock pin from a preselected position.

10. An applicator apparatus movable along a belt end to secure a row of aligned hinge belt fasteners to the belt end with staples, said applicator apparatus comprising an anvil means having a surface for deflecting the lower free ends of the staples to clinch the staples to the undersides of the belt fasteners, a staple guide block means mounted over said anvil means with a portion spaced from said anvil surface to admit a belt end and a plurality of belt fasteners, means mounting said staple guide block means for relative movement with respect to said anvil means between an open position admitting the belt end and a closed position for holding the belt for staple application, means in said guide block means defining openings for receiving staples and for guiding the staples into openings in the belt fasteners, means for holding belt fasteners against rearward movement and against forward movement and against lateral movement during staple application, and at least two separated resilient clamping means associated with said guide block means and said anvil means and engaging said belt at two locations and holding said belt to resist shifting of said belt or said applicator apparatus as would misalign hinge pin receiving openings in said hinge belt fasteners.

11. An apparatus in accordance with claim 10 in which at least two separate guide block means and anvil means are disposed side-by-side and in which one of said resilient clamping means for said belt is carried by each of said guide block means.

12. An apparatus in accordance with claim 11 in which said means for holding said belt fasteners against forward movement comprises a depending means on each of said guide block means to abut the free forward edge of the upper leg of a hinge belt fastener.

* * * * *

UNITED STATES PATENT AND TRADEMARK OFFICE
CERTIFICATE OF CORRECTION

PATENT NO. : 4,111,080
DATED : September 5, 1978
INVENTOR(S) : Winston C. Pray

It is certified that error appears in the above-identified patent and that said Letters Patent are hereby corrected as shown below:

Column 2, line 60, "quide" should read --guide--.
Column 6, line 43, after "manufactured" insert --by--.
Column 6, line 44, after "Burbank," insert --California,--.
Column 10, line 10, after "plurality of" insert --staple--.

Signed and Sealed this

First Day of May 1979

[SEAL]

Attest:

RUTH C. MASON
*Attesting Officer*

DONALD W. BANNER
*Commissioner of Patents and Trademarks*